Patented Mar. 22, 1927.

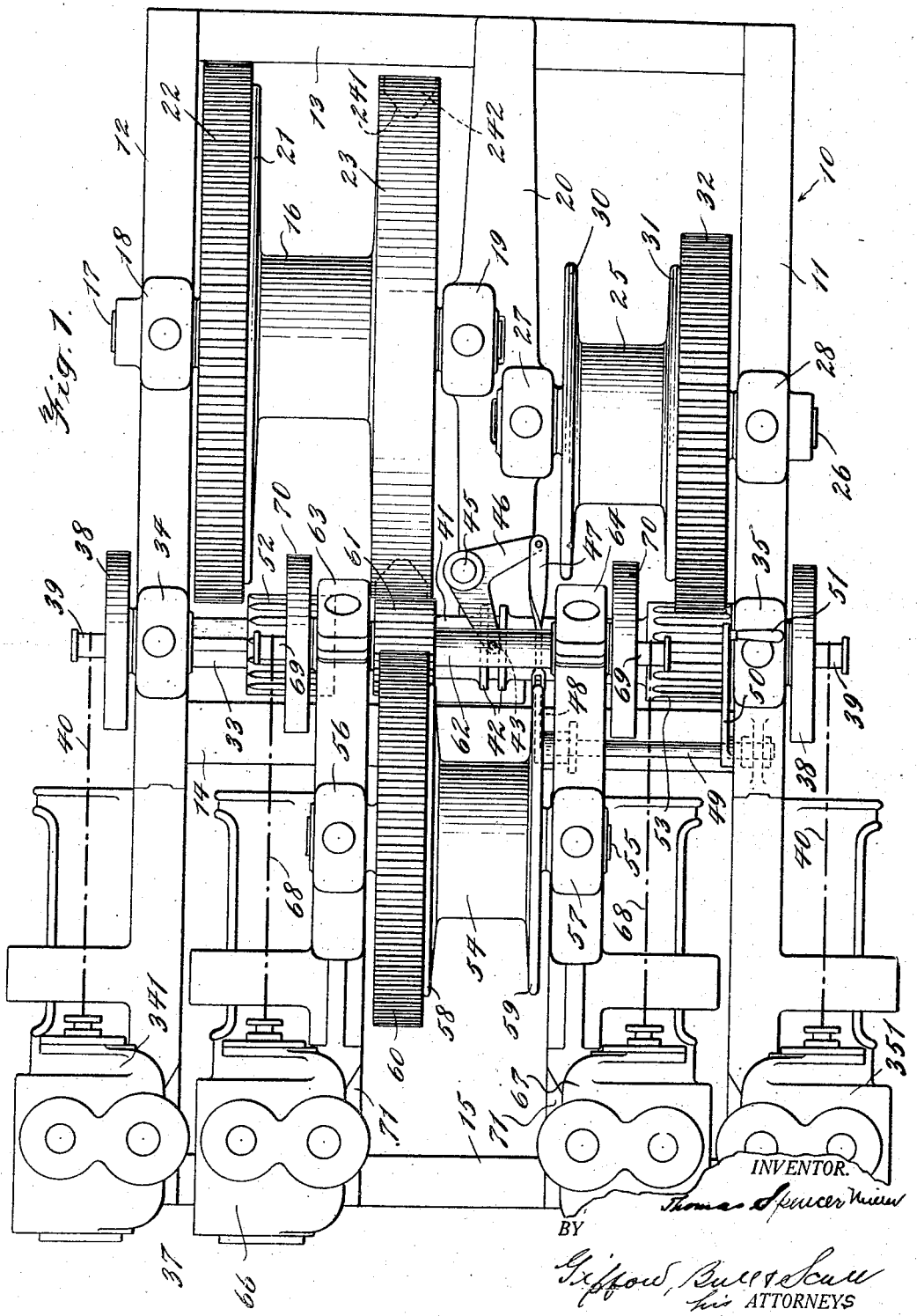

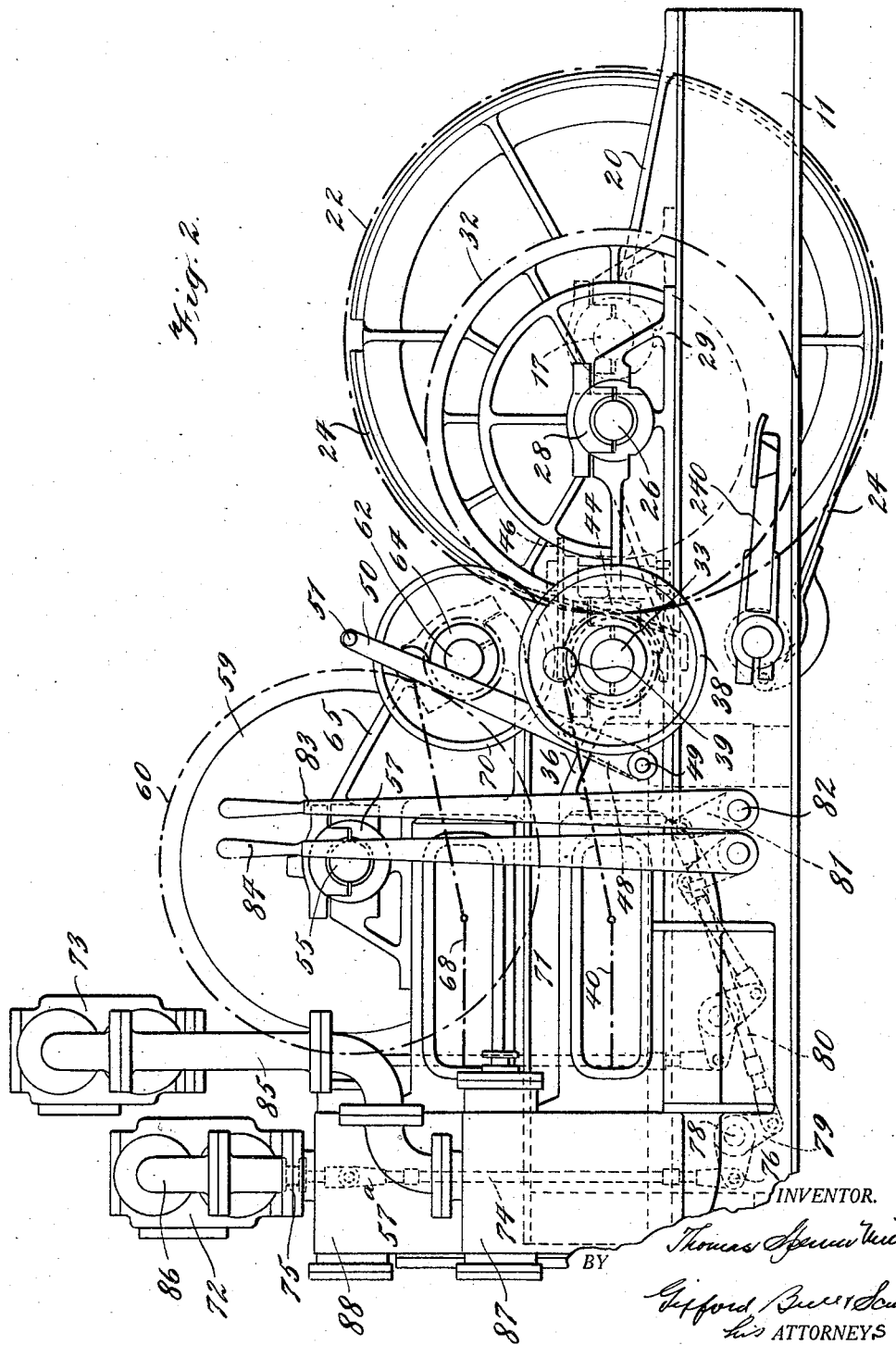

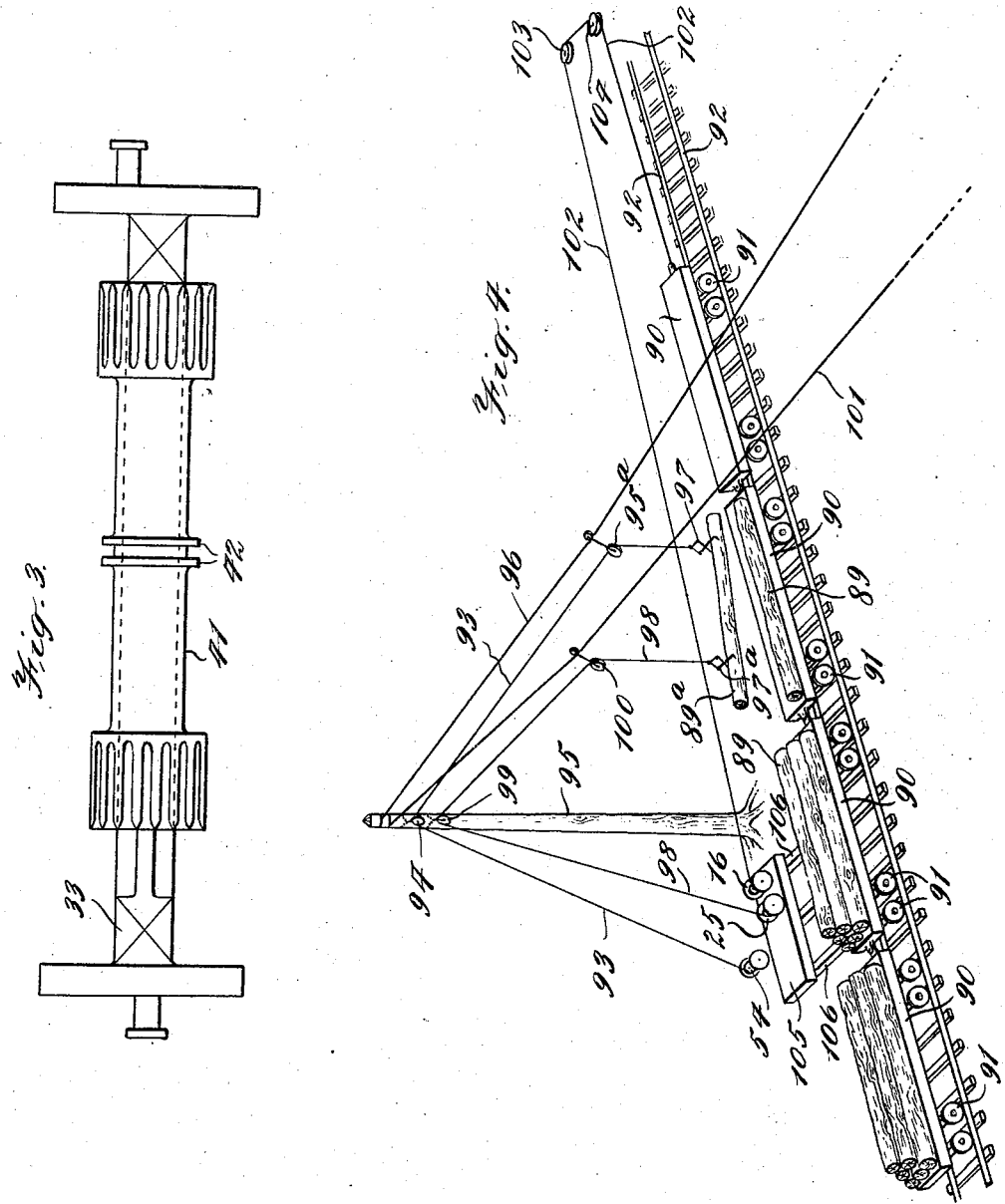

1,621,554

UNITED STATES PATENT OFFICE.

THOMAS SPENCER MILLER, OF SOUTH ORANGE, NEW JERSEY.

WINDING ENGINE.

Application filed December 29, 1922. Serial No. 609,581.

My invention consists of certain novel parts and combination of parts, particularly pointed out in the claims.

The following is a description of a winding engine embodying my invention in the form at present preferred by me, but it will be understood that various modifications and changes may be made therein without departing from the spirit of my invention and without exceeding the scope of my claims.

My invention will best be understood by reference to the accompanying drawings, in which Figure 1 is a plan view of a winding engine embodying my invention; Fig. 2 is a side elevation of Fig. 1; Fig. 3 is a detailed view of the operating shaft and associated sleeve for the lower engine, and Fig. 4 is a diagrammatic view illustrating the device embodying my invention in the operation of loading logs and spotting cars on which the logs are loaded.

Like reference characters indicate like parts throughout the drawings.

Referring, now, to the drawings, 10 indicates generally the bed-frame, preferably formed of I-beams comprising longitudinally extending members 11 and 12 connected by cross members 13, 14 and 15. A winding drum 16 is mounted on a shaft 17 having its bearings at 18 and 19 on a bracket carried by the longitudinal member 12, and on an arched member 20 bridging the cross members 13 and 14, respectively, as shown in Fig. 1.

One of the flanges 21 of the drum 16 is secured to a gear 22, while the other flange 23 serves as an element of a brake member for the drum 16. A brake-band 24 forms the other element, and may be operated by a foot-lever 240, which is here illustrated as a simple lever, but may be a compound lever, as understood. The flange 23 is preferably provided with a V-shaped groove 241, in which is mounted a wooden rim 242, for increasing the efficiency of the brake. A second drum 25 is fixed on a shaft 26, having its bearings at 27 and 28, mounted on the arched member 20, and a bracket 29 mounted on the side member 11, respectively. The drum 25 is provided with the usual side flanges 30 and 31, the latter being fixed to a gear 32, which is preferably of smaller diameter than the gear 22.

The gears 22 and 32, and their associated drums, are actuated from an operating shaft 33 having its bearings at 34 and 35, mounted on brackets supported on the side members 12 and 11, respectively, one of such brackets being indicated at 36 in Fig. 2. The shaft 33 is operated by a suitable motor, here shown as a steam engine, indicated generally at 37, and comprising two cylinders 341 and 351 supported on the bed-frame 10. The shaft 33 is actuated by crank-discs 38 provided with crank-pins 39 connected to the pistons of the respective cylinders 341 and 351 by the usual connecting-rods, indicated by dot and dash lines at 40. The shaft 33 is preferably square, or substantially square, in cross-section between the bearings 34 and 35, and mounted thereon is a sleeve 41, the opening through which is of the same form in cross-section as the shaft, so that the sleeve rotates with the shaft but is free to move longitudinally thereof. The sleeve is preferably provided at an intermediate portion with two spaced flanges 42 between which are received the pins 43 on opposite sides of the sleeve (only one of which is shown in Fig. 1) carried on the two arms of a yoke member 44 forming one arm of a bell-crank pivoted at 45, the other arm 46 of which is connected by a link 47 to the end of an arm 48 secured on a rock-shaft 49, and on the opposite end of which is attached an operating lever 50, provided with a suitable operating handle 51. By rocking the operating lever 50, therefore, the operator can, at will, move the sleeve 41 in either direction longitudinally of the shaft on which it is mounted. The sleeve 41 is provided with two pinions 52 and 53, the teeth of which are preferably pointed, as indicated in Fig. 1. The pinions 52 and 53 are so constructed and arranged with respect to the gears 22 and 32, respectively, that when the sleeve 34 is moved to its limiting position in one direction, as indicated in Fig. 1, with the end of the sleeve adjacent to the bearing 35, the pinion 53 is in engagement with the gear 32, while the pinion 52 is free from the gear 22, so that there is no connection whatever between the driving shaft 33 and the gear 22. On the other hand, when the sleeve 41 is moved to its limiting position in the opposite direction, with the opposite end of the sleeve adjacent to the bearing 34, then the pinion 52 is in engagement with the gear 22 and the pinion 53 is freed from the gear 32. It will be apparent, therefore, that only one of the drums, 16 or 25, is connected to the driving shaft at a given time, and is connected to the exclusion of the other.

A third drum 54 is mounted on a shaft 55 having its bearings at 56 and 57 on the framework of a steam engine, which I have indicated generally at 57$^a$ (see Fig. 2), superimposed on the frame of the engine 37. The drum 54 is provided with the usual flanges 58 and 59, the former of which is secured to a gear 60 meshing with a pinion 61 secured on an operating shaft 62 having its bearings at 63 and 64 in standards, one of which is shown at 65 in Fig. 2, on the engine frame. The shaft 62 is actuated by a second motor, here shown as a steam engine comprising two cylinders 66 and 67, the pistons of which are connected by connecting-rods 68 to the crank-pins 69 on crank-discs 70 secured to the shaft 62. The engine 57$^a$ is preferably mounted on I-beams 71, only one of said beams being shown in Fig. 2, the I-beams being mounted on the cross members 14 and 15 of the bed-frame. The cylinders 66 and 67 of the upper engine, as will be observed from Fig. 1, are preferably located closer together than are the cylinders 34 and 35 of the lower engine.

The steam supply to the lower and upper steam engines, respectively, is controlled by two valves, the valve casings of which are indicated at 72 and 73, respectively (see Fig. 2). The control valve 72 is operated by connections comprising a link 74, the upper end of which passes through a stuffing-box 75 into the valve casing 72, and the lower end of which is pivoted at 76 to one arm on a rock-shaft 78. Another arm 79 on said shaft 78 is connected by a link 80 to an arm 81 fast on a shaft 82, which is rocked by a manually-operated lever 83. Similarly, the controlling valve in the casing 73 is operated by a manually-operated lever 84, the connections between which and the valve are similar to those between the lever 83 and its valve, and need not be more fully described. The reciprocating controlling valves 72 and 73 are of a construction well known in the art, and the details of their construction need not be described. The valves are preferably so constructed and arranged, however, that when the operating handles 83 and 84 are in their neutral vertical positions, indicated in Fig. 2, the controlling valves are in a neutral position, to the blank off the steam from the source of steam supply, so that no steam flows through pipes 85 and 86 leading to the lower and upper engines, respectively. When the levers are moved to the left, as viewed in Fig. 2, the controlling valves are operated in a direction to admit steam to both the lower and upper engines, and cause the engines to operate their drums to raise the load. When the levers are moved to the right, as viewed in Fig. 2, the engines are reversed so that the drums are positively driven in the reverse direction to lower the load. The connections including the steam pipes 85 and 86 to the slide valves 87 and 88 are not fully illustrated, as the arrangement is one that is well known in the art.

In Fig. 4 I have illustrated a device embodying my invention in the operation of loading logs, indicated at 89, on cars, a plurality of which are indicated at 90, mounted on trucks, the wheels of which are indicated at 91, running on track rails 92. It is here assumed that the track is inclined, there being a downward inclination from the right of Fig. 4 toward the left. A rope or cable 93 is wound upon the drum 54 on the upper engine, and extends over a sheave 94 hung on a tree 95, or other support, and over a sheave 95$^a$ suspended from a cable 96, the end of the cable 93 being attached to a device, such as the log tongs 97, which may be secured to the end of a log. Similarly, a rope or cable 98 is wound upon the drum 25 and passes over a sheave 99 hung from the support 95, and passes over a sheave 100 suspended from a cable 101, the end of the cable 98 being attached to the log tongs 97$^a$.

In the embodiment here shown, a spotting line or cable 102 is wound upon the drum 16, and passes over sheaves 103, 104, and is attached at its end to the upper end car of the train. The winding engine, comprising the upper and lower steam engines and associated parts, is shown as mounted on a platform 105 mounted on suitable supports 106.

The operation of the device embodying my invention will readily be understood from the foregoing description, and is as follows:

At the beginning of the operation, the spotting cable leading to the spotting drum serves to hold a train of empty cars on the grade. The train is to be lowered, one car length at a time. When the first car is loaded with logs, the train is allowed to move one car length by releasing somewhat the brake 240 and brake-band 24 engaging the flange of the spotting drum, in conjunction with the control of steam to the steam engine, which is at this time operating the spotting drum. The spotting operation never takes place simultaneously with the loading operation, and it is desirable that the lower loading drum 25 be put out of gear at the time the spotting drum is in operation. This is accomplished by the operation of the sleeve heretofore described. When the train has been lowered to bring the next empty car into position to be loaded, then the sleeve is shifted in the opposite direction to bring the pinion 53 into mesh with gear 32, and to bring the pinion 52 out of mesh with the gear 22. The log tongs 97, 97$^a$ being attached to a log, here shown as 89ª, the levers 83 and 84 are moved to the left, as viewed in Fig. 2, thereby admitting steam to the cylinders of both the lower and upper engine in a direction to wind in the cables 93 and 98 and thereby raise the log. When the log is to be held suspended, the levers are moved slightly in the reverse direction, the compressed steam in the cylinders serving to prevent the cables 93 and 98 from paying out and the log descending. The operation of lowering the log is carried out by reversing the levers, thereby permitting the engines to run in the reverse direction, the lowering speed being regulated by the amount of movement of the levers in the reverse direction, and correspondingly controlling the steam in the cylinders.

In accordance with my invention, the spotting drum 16 and the loading drum 25 are mounted on independent shafts, and the connections between the operating shaft and these two drums are so constructed and arranged that only one of the drums is actuated at a time, and when in operation, the other drum is entirely disengaged from the operating shaft, either drum being positively operated in either direction by this engine. By this simple arrangement, I have dispensed with friction clutches and thereby greatly increased the efficiency of the operation. At the same time, by mounting the spotting drum 16 and the hoisting drum 25 on separate shafts, I am enabled to actuate them from the same shaft at different speeds; that is to say, the spotting drum 16, which is operated by the gear 22, is driven at a relatively low speed with high power, whereas the loading drum 25 is driven at a relatively high speed and low power.

It will also be apparent that the operation of all of the drums is governed by the controlling valves, and that only two of the drums are simultaneously operated when the sleeve is thrown to either of its extreme positions as it is in practice.

What I claim and desire to secure by Letters Patent of the United States is:

1. In a log loading and hauling machine, a first, a second, and a third drum each having a driving gear permanently secured thereto, three independent shafts on which the respective drums and associated gears are fixed, independent bearings for each of said shafts, a driving member comprising a shaft angular in cross section, a reversing motor for actuating said shaft, a sleeve fitted on said shaft and rotatable therewith but movable longitudinally thereof, means for moving said sleeve longitudinally of said shaft, said sleeve being provided with two pinions, the parts being constructed and arranged to cause one of said pinions to mesh with the gear associated with first said drum when in one position and the second pinion to be disengaged from the gear associated with the second drum, and in another position of said sleeve to cause the other pinion thereon to engage the gear associated with said second drum and the first mentioned pinion thereon disengaged from the gear associated with the first drum, a second drive shaft, an independent reversing motor for actuating said second shaft, and means for actuating the gear associated with the third drum from said second drive shaft.

2. In a loading and hauling machine, two independent drums 16 and 25 each having a gear and a shaft fixed to said gear, independent bearings for said shafts, a reversing motor having a drive shaft 33 alternately driving drums 16 and 25, a slidable sleeve on shaft 33 provided with pinions 52 and 53 to alternately mesh with and drive the drum gears, a third drum 54 having its shaft and gear fixed thereto, and a second reversing motor having driven shaft 62, pinion 61 meshing with gear 60 for driving drum 54, the last named motor and drum being mounted compactly and above the first motor and its related drums and on the same frame.

THOMAS SPENCER MILLER.